Feb. 19, 1935.  P. L. BARBER  1,991,649
MOLDED CONTAINER
Filed May 24, 1932  2 Sheets-Sheet 1

Inventor
P. Lee Barber
By Clarence A. O'Brien
Attorney

Feb. 19, 1935.  P. L. BARBER  1,991,649
MOLDED CONTAINER
Filed May 24, 1932   2 Sheets-Sheet 2

Inventor
P. Lee Barber
By Clarence A. O'Brien
Attorney

Patented Feb. 19, 1935

1,991,649

UNITED STATES PATENT OFFICE 1,991,649

MOLDED CONTAINER

Pearley Lee Barber, Turner, Oreg.

Application May 24, 1932, Serial No. 613,312

5 Claims. (Cl. 107—19)

My invention relates to improved molded containers and to an improved method of making the same.

It is an important object of my invention to provide containers of the type which is used to hold confections, and which may be made of edible material or materials which may be chewed, once the contents has been consumed.

It is also an important object of my invention to provide a method of constructing such containers by molding, whereby they may be made efficiently at low cost.

It is also an important object of my invention to provide containers of this class which are made in separable sections which may be easily taken apart or put together for opening or closing them.

Other objects and advantages of my invention will be apparent from a reading of the following description of the drawings, wherein for purposes of illustration I have shown a preferred embodiment of the invention.

In the drawings:—

Figure 1:
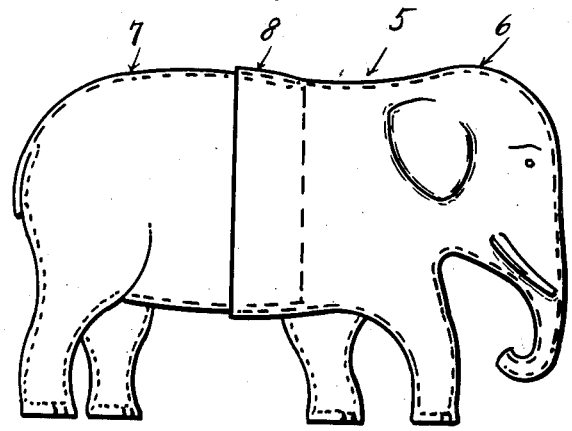
Figure 1 is a general side elevational view of a preferred form of container constructed in accordance with the principles of my invention.

Parawax, a chewable confection, and chocolate, and the like, have long been used for forming containers for confections, and to constitute forms adapted to be utilized as ornaments or displays whether unfilled or filled with confection or the like, or as toys. Different methods of making and forming such containers have been in use, but to the best of my knowledge, none of these methods affords the advantages of the structure which I achieve by my improved method, by virtue of which separable sections are provided and which are adapted to be assembled and disassembled in a quick and easy and convenient manner.

Referring to the drawings in detail, wherein like numerals refer to like parts throughout the same, the numeral 5 generally designates an animal form container constructed in accordance with the principles of my invention, which is composed of the front section 6 and the rear section 7. The rear end of the front section 6 is provided with an expanded sleeve portion 8 into which is adapted to be telescoped the front part of the rear section 7. The sections may be recessed so that the resulting form will be hollow so as to be capable of containing confections of any desired type. The form itself may be constructed of parawax or the equivalent or of other confection such as chocolate and the like. Because of the construction of the form, it is an easy matter to connect and disconnect the front and rear sections thereof in telescoped fashion without damaging or impairing the form, whether filled or unfilled with confection or the like, whereas most forms now in use necessarily involve damaging or impairing some part of the form or container in order to enable the removal of the contents thereof or for other purposes.

Figure 2:
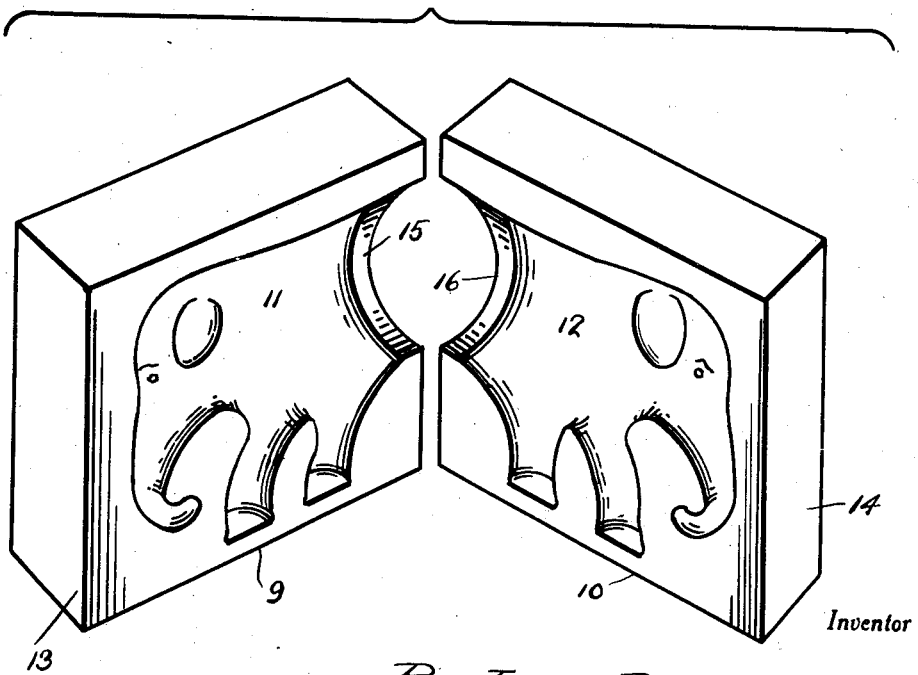
Figure 2 is a group view in perspective of the halves of the front portion of the mold which I employ.
Figure 3:
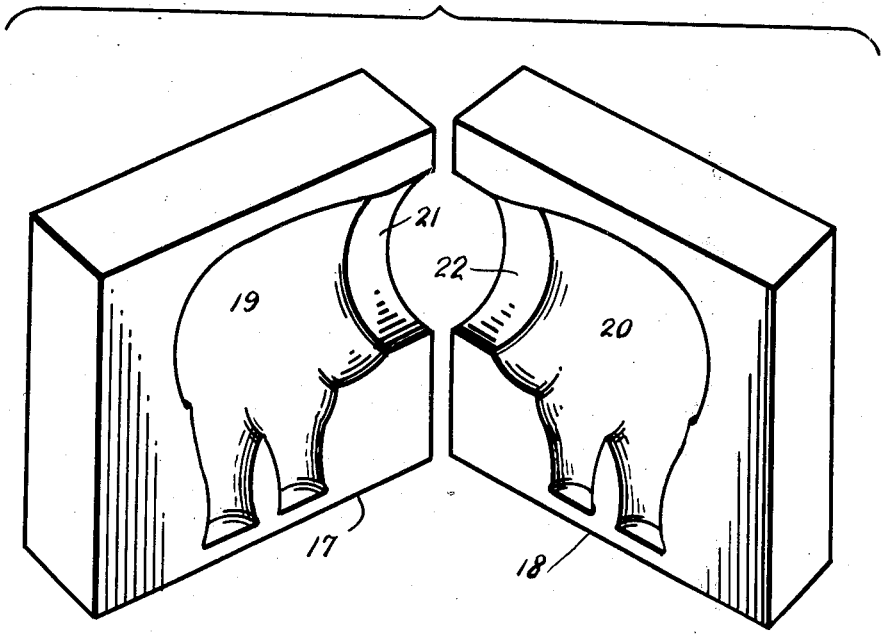
Figure 3 is a similar view of the rear sections of the mold.
Figure 4:
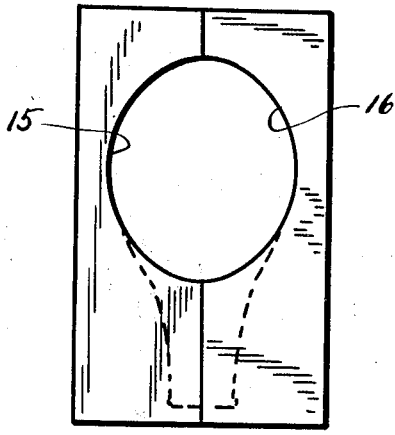
Figure 4 is an end view of a pair of the mold sections in abutted relationship.
Figure 5:
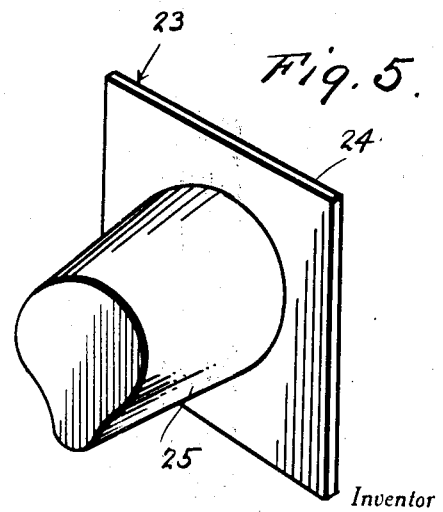
Figure 5 is a perspective view of one of the cores.

Reference to the Figures 2 to 5 of the drawings discloses the provision of a pair of front mold sections 9 and 10 which may be formed of aluminum to secure light weight, or of any other suitable material adapted to act as a mold form. The sections 9 and 10, as seen, are generally rectangular in form for convenience and are provided on their inner faces with depressions 11, 12 which represent in contour, half of the forepart of the animal selected. It will be observed that while the front ends 13, 14 of the blocks 9, 10 are plain and unindented, the corresponding rear ends are curvedly cut away as indicated at 15 and 16 to provide an orifice. In the front sections 9, 10 this orifice is of a contour and size to form the expanded sleeve portion 8, while the corresponding orifice in the front ends of the blocks 17, 18 of the rear mold section is such as to provide the reduced telescoping portion on the front end of the rear animal section. The depressions 19, 20 in the rear mold sections are of a contour to form the rear portion of the animal form. The numerals 21, 22 indicate the portions which define the orifice in the front end of the rear mold section. As intimated, the halves of the animal form are to be cast separately in the pairs of blocks 9, 10 and 17, 18. The animal form sections are then assembled by telescoping as already mentioned.

In some instances it will be necessary to use the cores generally designated 23 which comprise the plate 24 for engaging the ends of the mold sections and the laterally projecting specially formed block 25 carried thereby, for positioning in spaced manner within the orifices mentioned so as to procure formation of the animal sections with an interior recess or hollow, as when chocolate or the like is used in molding the animal forms. Where, however, parawax and the like is used as the molding material, these core forms will not be required, as the method in the use of parawax is to pour the parawax into the mold section and then to pour out the excess of parawax, sufficient of the parawax adhering to the walls of the mold section as a result of this operation to constitute the form upon solidifying.

Of course, my invention is not limited to the formation of animal forms as illustrated in the drawings, but any forms may be made as chosen. In this way, attractive and useful novelties of a wide variety of forms may be cheaply constructed so as to possess the advantages mentioned and other obvious advantages, when used as containers, souvenirs, novelties, or toys.

Though I have shown and described herein a preferred embodiment of the invention, it is to be definitely understood that I do not desire to limit the application of the invention thereto, and any change or changes may be made in material and structure and arrangement of parts, and in the sequence and duration of steps and operations involved in the method, within the spirit of the invention and the scope of the subjoined claims.

What is claimed is:—

1. A mold for making a hollow edible material animal form in two parts, said mold consisting of a hind member and a fore member, said hind member consisting of a pair of longitudinally separable sections each of which is provided on its meeting face with a recess formed to the shape of one side of the hind part of said animal form including a forwardly tapered semi-annular region opening through the front end of the section, said sections being arranged to have their meeting faces engaged during the molding; said fore member consisting of a pair of longitudinally separable sections each of which is provided on its meeting face with a recess formed to the shape of a side of the fore part of said animal and including a rearwardly flaring semi-annular region opening through the rear end of the section, the last mentioned semi-annular region defining a rearwardly flaring annulus when the last mentioned sections have their meeting faces engaged, said annulus being of larger diameter but conforming flare to the tapered annulus formed by said tapering semi-annuli as a result of engaging the meeting faces of sections of the hind member.

2. A mold for making a hollow edible material animal form in two parts, said mold comprising a hind member and a fore member, said hind member consisting of a pair of longitudinally separable sections each of which is provided on its meeting face with a recess formed to the shape of one side of the hind part of said animal form including a forwardly tapered semi-annular region opening through the front end of the section, said sections being arranged to have their meeting faces engaged during the molding; said fore member consisting of a pair of longitudinally separable sections each of which is provided on its meeting face with a recess formed to the shape of a side of the fore part of said animal and including a rearwardly flaring semi-annular region opening through the rear end of the section, the last mentioned semi-annular region defining a rearwardly flaring annulus when the last mentioned sections have their meeting faces engaged, said annulus being of larger diameter but conforming flare to the tapered annulus formed by said tapering semi-annuli as a result of engaging the meeting faces of sections of the hind member, and a tapering core to be disposed in spaced relation to said flaring annulus to assure accurate interior surfaces in said flaring annulus, said core being mounted on a plate engageable with the rearward end of the assembled fore member for supporting said core in position.

3. A mold of the character described comprising a front member and a rear member for forming the forepart and hindpart respectively of a hollow edible material animal form when the edible material is poured therein in fluid form and permitted to harden, each of said members consisting of a pair of blocks disposed in side by side abutting relation and having in their abutting sides registering depressions defining recesses conforming in shape to the corresponding opposite sides of the respective forepart and hindpart of the animal form, the recess forming depressions of the front member extending through the rear thereof and defining a flared opening designed to produce a flaring flange on the rear end of the forepart of the animal form, the recess forming depressions of the rear member extending through the front thereof and defining a forwardly converging tapering opening designed to produce a tapering flange on the front of the hindpart of the animal form frictionally telescopable into said flaring flange to separably connect the forepart and the hindpart of said animal form.

4. A mold of the character described comprising a front member and a rear member for forming the forepart and hindpart respectively of a hollow edible material animal form when the edible material is poured therein in fluid form and permitted to harden, each of said members consisting of a pair of blocks disposed in side by side abutting relation and having in their abutting sides registering depressions defining recesses conforming in shape to the corresponding opposite sides of the respective forepart and hindpart of the animal form, the recess forming depressions of the front member extending through the rear thereof and defining a flared opening designed to produce a flaring flange on the rear end of the forepart of the animal form, the recess forming depressions of the rear member extending through the front thereof and defining a forwardly converging tapering opening designed to produce a tapering flange and the front of the hindpart of the animal form frictionally telescopable into said flaring flange to separably connect the forepart and the hindpart of said animal form, said convergingly tapered opening and said flaring opening being relatively axially elongated so as to produce unusual axial elongation of said flaring flange and of said tapering flange.

5. A mold of the character described comprising a front member and a rear member for forming the forepart and hindpart respectively of a hollow edible material animal form when the edible material is poured therein in fluid form and permitted to harden, each of said members consisting of a pair of blocks disposed in side by side abutting relation and having in their abutting sides registering depressions defining recesses conforming in shape to the corresponding opposite sides of the respective forepart and hindpart of the animal form, the recess forming depressions of the front member extending through the rear thereof and defining a flared opening designed to produce a flaring flange on the rear end of the forepart of the animal form, the recess forming depressions of the rear member extending through the front thereof and defining a forwardly converging tapering opening designed to produce a tapering flange on the front of the hind-part of the animal form frictionally telescopable into said flaring flange to separably connect the forepart and the hindpart of said animal form, and a core supported within and substantially concentrically spaced from the sides of said flaring opening, the exterior of said core having a taper conforming substantially to the taper of the interior of said convergingly tapered opening of the rear member and with the exterior taper of the tapering flange of the hindpart of the resulting animal form whereby the interior of said flaring flange is conditioned to conformably and frictionally receive and hold said tapering flange of the hindpart of the animal form.

PEARLEY LEE BARBER.